(12) United States Patent
Hughes et al.

(10) Patent No.: US 6,519,768 B1
(45) Date of Patent: Feb. 11, 2003

(54) INSTRUCTION TRANSLATION METHOD

(75) Inventors: Kevin Hughes, Glossop (GB); John Richard Eaton, Salford (GB)

(73) Assignee: International Computers Limited, London (GB)

( * ) Notice: Subject to any disclaimer, the term of this patent is extended or adjusted under 35 U.S.C. 154(b) by 0 days.

(21) Appl. No.: 09/496,918

(22) Filed: Feb. 2, 2000

(30) Foreign Application Priority Data

Mar. 4, 1999 (GB) .............................................. 9904823
Mar. 4, 1999 (GB) .............................................. 9904824

(51) Int. Cl.⁷ .............................................. G06F 9/45
(52) U.S. Cl. ........................ 717/159; 717/141; 717/154
(58) Field of Search ...................... 717/9, 8, 5, 127–160

(56) References Cited

U.S. PATENT DOCUMENTS

| | | | | |
|---|---|---|---|---|
| 5,613,117 A | * | 3/1997 | Davidson et al. ............... | 717/8 |
| 5,623,617 A | | 4/1997 | Davidian ..................... | 395/568 |
| 5,659,753 A | * | 8/1997 | Murphy et al. ................ | 717/5 |
| 5,828,875 A | * | 10/1998 | Halvarsson et al. ........... | 717/5 |
| 5,911,070 A | * | 6/1999 | Solton et al. .................... | 717/1 |
| 6,016,467 A | * | 1/2000 | Newstead et al. ............. | 704/9 |
| 6,237,135 B1 | * | 5/2001 | Timbol .......................... | 717/1 |

FOREIGN PATENT DOCUMENTS

| | | |
|---|---|---|
| EP | 0 388 077 | 9/1990 |
| EP | 0 423 597 | 4/1991 |

OTHER PUBLICATIONS

Chambers, "Automatic Dynamic Compilation System for Event Dispatching in Extensible Systems", 1996.

* cited by examiner

*Primary Examiner*—Tuan Q. Dam
*Assistant Examiner*—Chuck Kendall
(74) *Attorney, Agent, or Firm*—Lee, Mann, Smith, McWilliams, Sweeney & Ohlson

(57) ABSTRACT

A method of translating source code instructions into target code instructions is described. Prior to translate time, an existing interpreter is analyzed to identify sequences that implement individual source order code instructions. Sub-sequences within each template that implement predetermined sub-functions are identified and eliminated. The sequences are compiled and stored as templates. For each instruction in an input block of source code instructions, the appropriate template for that source code instruction is selected and appended to an output block of target code instructions. The source code block is then analyzed to determine the net effect of the non-implemented sub-functions, and code is planted in the output block to achieve this net effect.

13 Claims, 3 Drawing Sheets

INSTRUCTION TRANSLATION METHOD

BACKGROUND OF THE INVENTION

This invention relates to a method for translating instructions in a computer system.

The invention is particularly concerned with a computer system in which source code instructions are translated into target code instructions for execution on a particular processor. This may be required, for example, where one processor is being used to emulate another, in which case the instructions for the processor being emulated must be translated into instructions for the emulating processor.

One approach, referred to as interpretation, is to create a software model of the processor being emulated. This model operates by reading each target instruction, decoding it, and selecting one of a number of sequences that perform the same function as the instruction being emulated. This fetch/decode/execute sequence is repeated for each source code instruction in turn.

A more efficient approach is to translate a block of source code instructions, rather than a single instruction. That is, the source code is divided into blocks, and each source code block is translated into a block of target code instructions, functionally equivalent to the source code block. Typically, a block has a single entry point and one or more exit points. The entry point is the target of a source code jump, while the (or each) exit is a source code jump.

Translating blocks is potentially much more efficient, since it provides opportunities for eliminating redundant instructions within the target code block, and other optimisations. Known optimising compiler techniques may be employed for this purpose. To increase efficiency further, the target code blocks may be held main memory and/or a cache store, so that they are available for re-use if the same section of code is executed again, without the need to translate the block.

However, the process of designing such a translator is very complex, and it is difficult to avoid errors in translation. One object of the present invention is to provide an improved translation technique, which reduces such errors.

Another object of the present invention is to provide a novel technique for improving the efficiency of block-oriented code translation.

SUMMARY OF THE INVENTION

According to the invention, in a computer system, a method of translating source code instructions into target code instructions comprises the steps:

(a) analysing an existing interpreter to identify sequences that implement individual source code instructions and storing those sequences as templates; and (b) for each instruction in an input block of source code instructions, selecting an appropriate template for that source code instruction and appending this template to an output block of target code instructions.

It can be seen that this uses an existing interpreter as the basis for building a translation mechanism. Assuming that the existing interpreter is already fully validated, the possibility of errors in the templates is correspondingly reduced. In effect, the invention provides a way of "leveraging" an existing interpreter.

According to another aspect of the invention, in a computer system, a method of translating source code instructions into target code instructions comprises the steps:

(a) providing a plurality of templates, which implement respective source code instructions, without implementing predetermined sub-functions within the source code instructions;

(b) for each instruction in an input block of source code instructions, selecting an appropriate template for that source code instruction and appending this template to an output block of target code instructions;

(c) analysing the source code block to determine the net effect of the non-implemented sub-functions; and (d) planting code in the output block to achieve this net effect.

It can be seen that this provides templates from which sub-functions have been eliminated, and then re-introduces the effect of these eliminated sub-functions on a per-block basis. This gives opportunities for optimisation by allowing sub-functions to be coalesced or simply omitted where they are redundant. In particular, a number of address range checks may be merged into a single check.

One embodiment of the invention will now be described by way of example with reference to the accompanying drawings.

DESCRIPTION OF AN EMBODIMENT OF THE INVENTION

The present embodiment is concerned with a mechanism for translating instructions from a source instruction set into a target instruction set. For example, the source instruction set may be the ICL VME instruction set, and the target instruction set may be a microprocessor assembler language.

The ICL VME instruction set is complex, and each instruction may involve a number of sub-functions such as, for example:

calculating an operand address, performing range checks on the operand address; for example, checking that the address of a stack operand is not greater than the current stack front, fetching or storing an operand, writing or reading an operand to or from a register, clearing or setting an overflow register OV, incrementing a program counter register PC by an amount dependent on the instruction length.

It is assumed that there exists a fully validated interpreter for translating all instructions in the source instruction set. This interpreter may be written either in a high-level language, as a set of macros, or in assembler language, with a defined sequence for each instruction in the source instruction set. Each of these interpreter sequences, in turn, includes a number of sub-sequences, for translating the sub-functions in the instruction. For example, an interpreter sequence may contain sub-sequences for calculating the operand address, performing range checks on the operand address, and so on.

Figure 1:
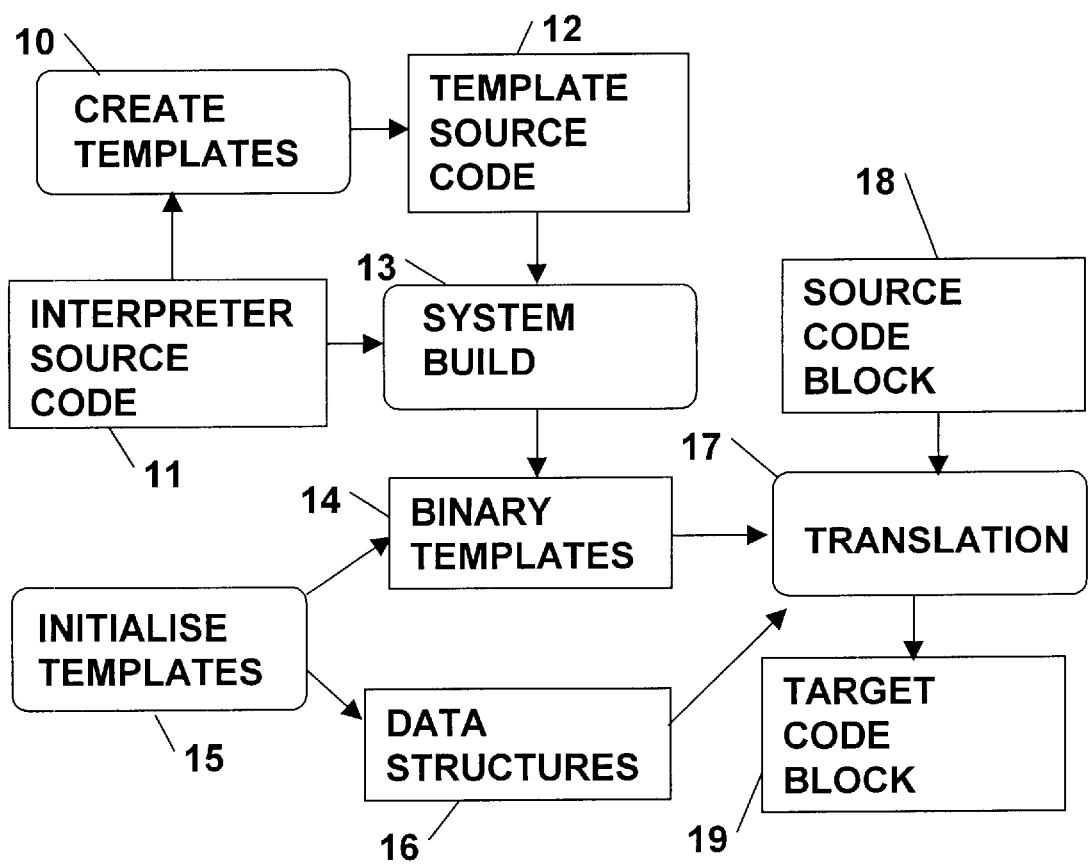
FIG. 1 is a block diagram showing the main data structures and processes involved in this embodiment.

Referring to FIG. 1, prior to system build time, a Create Templates process 10 is performed. This process takes the existing interpreter source code 11, and generates a set of template source code sequences 12, one for each instruction in the source instruction set. The template source code sequences at this stage are source code sequences derived from the interpreter source code. In the present embodiment of the invention, the process 10 is performed manually, but in other embodiments it could be performed automatically, by a suitable program.

Figure 2:
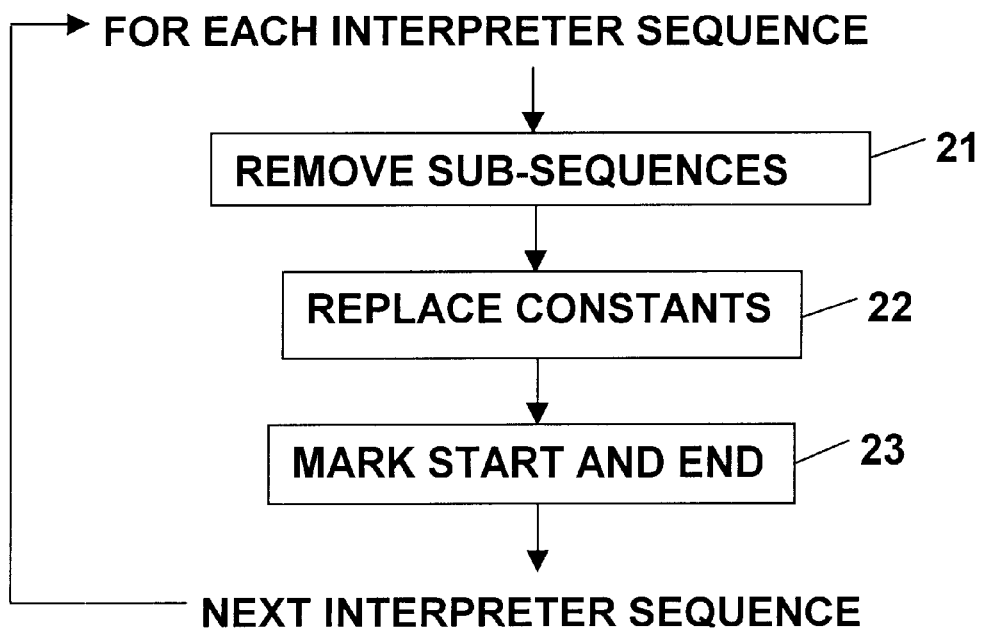
FIG. 2 is a flow chart of a process for forming templates from an existing interpreter code.

FIG. 2 is a flowchart of the Create Templates process 10. In this process, the source interpreter code 11 is scanned, to identify the sequences corresponding to individual instructions in the source instruction set. For each sequence, the following actions are performed.

(Step 21) First, the interpreter sequence is copied to the template source code 12. The template source code is then scanned to detect sub-sequences representing certain predetermined common sub-functions, and these sub-functions are removed from the template code. In this example, the sub-functions that are removed include PC update, OV clearing, and operand address range checks.

In the case where the interpreter code is macro-generated, the removal of the predetermined sub-functions is achieved by modifying the macros. For example, consider the case where the interpreter contains the following macros:

CHECK_VA(x,y)—check a virtual address x against a limit y.
CLEAROV()—clear the overflow register OV.
UPDATEPC(n)—add n to the program counter register PC.

In this case, CHECK_VA(x,y) would be modified to always return "true" (if this check can be performed statically), while CLEAROV( ) and UPDATEPC(n) would be modified to do nothing.

(Step 22) Next, the template source code 12 is scanned, looking for constants that will be derived from literal values in the target instructions at translate (run) time. These constants are replaced with predetermined literal marker values.

(Step 23) Finally, the start and end of each template source code sequence are marked by planting suitable binary codes in the template source code 12.

Referring again to FIG. 1, the resulting template source code sequences 12 are then compiled as part of the standard system build process 13, resulting in a set of binary templates 14.

Figure 3:
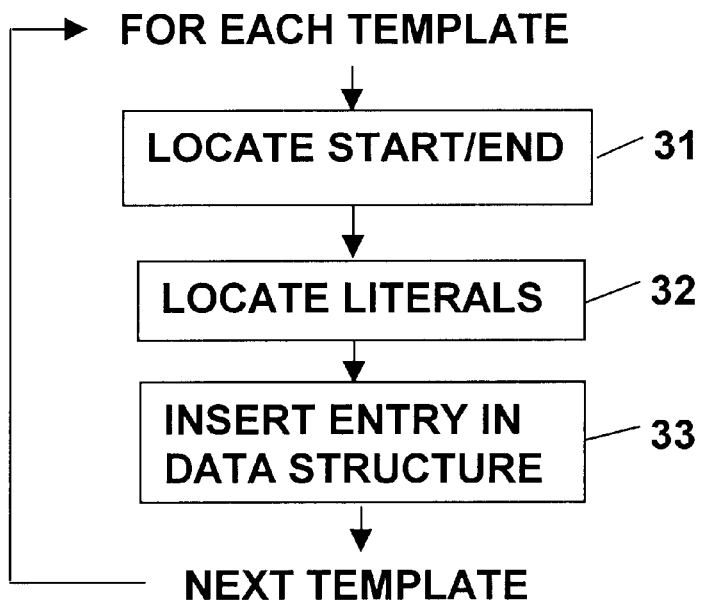
FIG. 3 is a flow chart of a process for initialising the templates.

At system initialisation, an Initialise Templates process 15 is performed. Referring to FIG. 3, this process performs the following actions for each binary template 14 in turn.

(Step 31) First, the Initialise Templates process scans the binary template to locate the start/end of the binary template (using the binary codes planted at step 23 above). This information is added to a set of data structures 16 to enable the translator to locate the binary template.

(Step 32) Next, the binary template is scanned to locate the marker values that were inserted at step 22 above, and to locate all calls within the template.

(Step 33) For each marker value in the template, the Initialise Templates process inserts an entry (referred to herein as a "fix-up" entry) in the data structures 16. The fix-up entry identifies the location of the marker value and specifies the data type of the constant value that is to be inserted into the code at translate time (run time) to replace the marker value. Similarly, for each call in the template, the Initialise Templates process inserts a fix-up entry in the data structures 16, identifying the location of the call.

Figure 4:
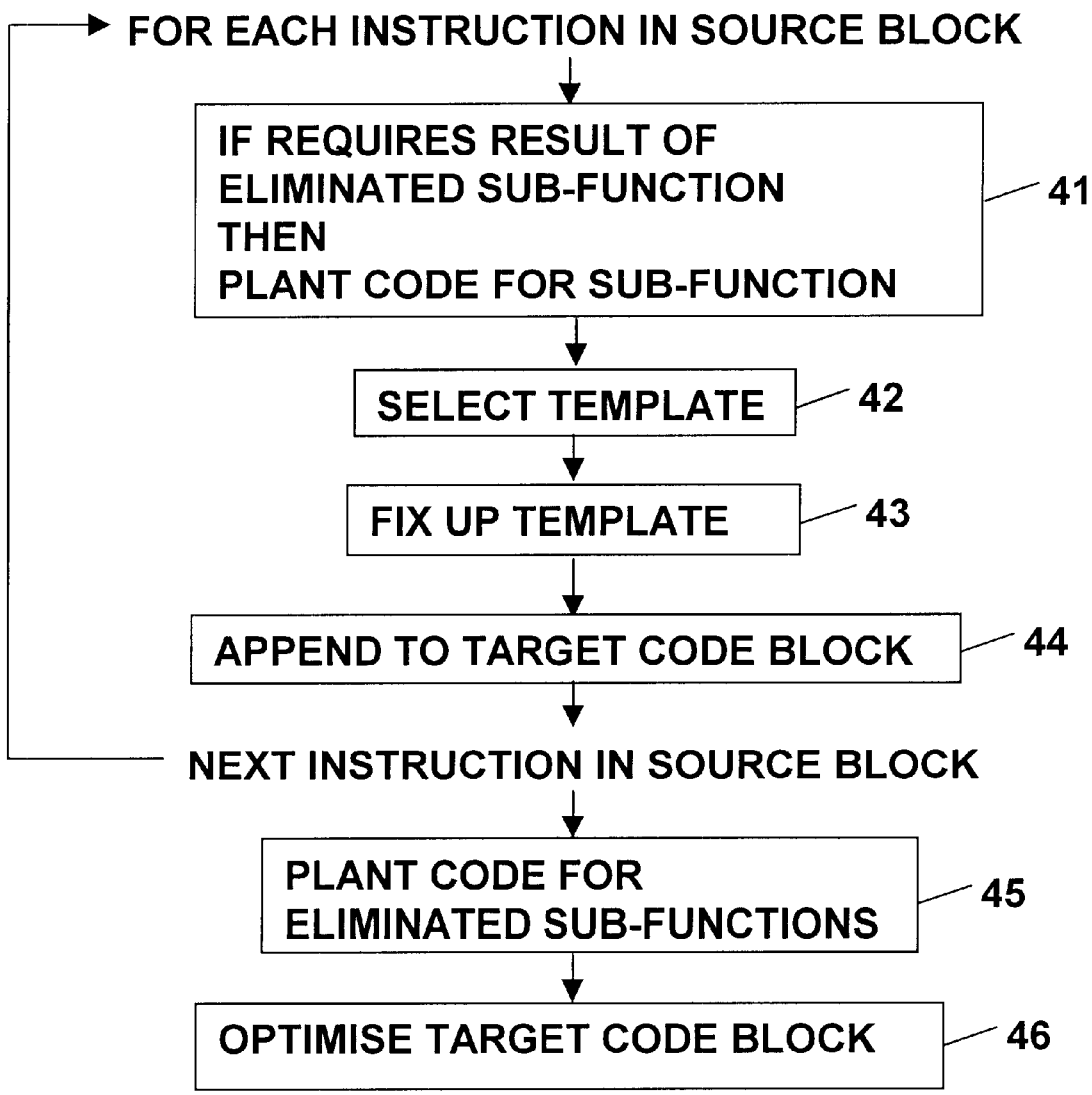
FIG. 4 is a flow chart of a process for translating a block of source code, using the templates.

At run time, a Translation process 17 (FIG. 1) is performed. This process takes source code blocks 18, and translates each block into a target code block 19, using the binary templates 14 and the data structures 16. Referring to FIG. 4, the process 17 selects each instruction in the source code block 18 in turn, and performs the following actions on the currently selected instruction.

(Step 41) First, the Translation process determines whether the current instruction requires an operand that would have been generated by one of the eliminated sub-functions. If so, it plants code in the target code block 19, to perform the actions of the eliminated sub-sequence. For example, suppose the Translator procedure finds that the current instruction uses the value of the PC register, but one or more preceding instructions in the block have had their PC update sub-functions eliminated. In this case, the Translator procedure will plant code to bring the PC register up to date.

(Step 42) Next, the Translation process identifies the instruction type of the current instruction, and selects the binary template 14 corresponding to this instruction type from the data structure created in step 31.

(Step 43) The Translation process then looks up the data structures 16, to identify any fix-up entries for the template. In the case where a fix-up entry represents a constant, the process inserts the required constant. The constant is derived from the parameters of the current instruction, according to its specified data type. In the case where a fix-up entry represents a call, the process inserts the required information for the call.

(Step 44) The fixed-up template is appended to the output target code block 19.

(Step 45) After all the instructions in the source code block have been processed in this way, the Translation process scans the source code block 18 to determine the net effect of the eliminated sub-functions. It then plants code in the target code block 19, to ensure that this net effect is achieved.

In this step, the Translation process determines which of the instructions in the source code block require an operand address range check. It then plants code at the beginning of the target code block 19, to perform a combined range check, having the same net effect as all the eliminated range checks in the block.

For example, consider the following block of source code:
N=5 check 5<SF−LNB
N=6 check 6<SF−LNB
N=7 check 7<SF−LNB
(where SF denotes a stack front register and LNB denotes a local name base register). The sub-functions for these three range checks will be eliminated by the Create Templates process. The Translation process therefore plants a single merged range check, which checks SF−LNB against the maximum of the three values (5,6,7):
7<SF−LNB.
It can be seen that if this test passes, all three original tests must pass.

Now consider the following block of code:
N=5 check 5<SF(0)−LNB
SF(1)=SF(0)+5
N=11 check 11<SF(1)−LNB
SF(2)=SF(1)−5
N=7 check 7<SF(2)−LNB
In this case the value of SF is modified during execution of the block, and hence a merged check based on the maximum of the three values (5,11,7) would fail.

The Translation process solves this problem by tracking the adjustment of SF, and replacing the checks as follows:

N=5 check 5<SF(0)–LNB
SF(1)=SF(0)+5
N=11 check 11<SF(0)+5–LNB
SF(2)=SF(1)–5
N=7 check 7<SF(0)+5–5–LNB
This is simplified to become:
N=5 check 5<SF(0)–LNB
SF(1)=SF(0)+5
N=11 check 6<SF(0)–LNB
SF(2)=SF(1)–5
N=7 check 7<SF(0)–LNB The translation process then plants a single check, based on the maximum of these new values i.e. (7<SF–LNB). This approach works both for positive and negative adjustment of SF.

Also in step 45, the Translation process determines the amount by which each instruction in the source code block updates the PC register, and then plants a single instruction at the end of the target code block, to increment the PC register by the total of all these updates.

(Step 46) Finally, as an optional step, the Translation process may perform further optimisations on the target code block 19, using conventional optimisation techniques, such as register tracking to eliminate redundant register reads and writes.

In summary, it can be seen that the translation mechanism described above uses an existing interpreter to form templates for translating individual instructions. Because the interpreter is fully validated, the templates should also be error-free.

The efficiency of the generated code is improved by eliminating certain common sub-functions (such as "update PC") from the templates, and planting code in the target code block to restore the net effect of the eliminated sub-functions where necessary. Thus, these sub-functions are promoted from a per-instruction basis to a per-block basis.

Some Possible Modifications

It will be appreciated that many modifications may be made to the system described above without departing from the scope of the present invention. For example, the choice of sub-functions to be eliminated may be varied, according to the particular source instruction set. Equally, no optimisation may be done at all.

In another possible modification, the template initialisation process could be performed as part of the system build. In other words, part of the build process would be to compile the source templates and then to scan the resulting object code to locate the necessary information.

What is claimed is:

1. In a computer system, a method of translating source code instructions into target code instructions, said method comprising the steps:
   (a) analysing an existing interpreter to identify sequences that implement individual source code instructions and storing those sequences as templates;
   (b) identifying and eliminating sub-sequences within each template that implement predetermined sub-functions;
   (c) for each instruction in an input block of source code instructions, selecting an appropriate template for that source code instruction and appending this template to an output block of target code instructions;
   (d) analysing the source code block to determine the net effect of the eliminated sub-sequences; and
   (e) planting code in the output block to achieve this net effect.

2. A method according to claim 1 wherein the sub-sequences that are eliminated include a sub-sequence for updating a program counter.

3. A method according to claim 1 wherein the sub-sequences that are eliminated include a sub-sequence for clearing an overflow register.

4. A method according to claim 1 wherein the sub-sequences that are eliminated include a sub-sequence for performing address range checks.

5. A method according to claim 1 further including, for each instruction in the input block, determining whether the instruction requires the result of an eliminated sub-sequence and, if so, planting code in the output block to supply that result.

6. A method according to claim 1 wherein the step of analysing an existing interpreter is performed prior to run time, and the step of selecting an appropriate template and appending this template to an output block of target code instructions is performed at run time.

7. In a computer system, a method of translating source code instructions into target code instructions, the method comprising:
   (a) providing a plurality of templates, which implement respective source code instructions, without implementing predetermined sub-functions within the source code instructions;
   (b) for each instruction in an input block of source code instructions, selecting an appropriate template for that source code instruction and appending this template to an output block of target code instructions;
   (c) analysing the source code block to determine the net effect of the non-implemented sub-functions; and
   (d) planting code in the output block to achieve this net effect.

8. A method according to claim 7 wherein said non-implemented sub-functions include a plurality of address range checks, and wherein said step of planting code comprises planting code for performing a merged address range check equivalent to said plurality of address range checks.

9. A method according to claim 8 including the step of modifying said merged address range check, to relate address range checks within the block to an initial value of a register on entry to the block, thereby ensuring that the check is still correct even if the value of said register changes during the execution of the block.

10. A method according to claim 7 further including, for each instruction in the input block, determining whether the instruction requires the result of a non-implemented sub-function and, if so, planting code in the output block to supply that result.

11. A computer system for translating source code instructions into target code instructions, the system comprising:
   (a) a plurality of templates, which implement respective source code instructions, without implementing predetermined sub-functions within the source code instructions;
   (b) means for selecting an appropriate template for each instruction in an input block of source code instructions, and appending this template to an output block of target code instructions;
   (c) means for analysing the source code block to determine the net effect of the non-implemented sub-functions; and
   (d) means for planting code in the output block to achieve this net effect.

12. A system according to claim 11 wherein said non-implemented sub-functions include a plurality of address range checks, and wherein said means for planting code comprises means for planting code for performing a merged address range check equivalent to said plurality of address range checks.

13. A system according to claim 11 further including means for determining, for each instruction in the input block, whether the instruction requires the result of a non-implemented sub-function and, if so, for planting code in the output block to supply that result.

* * * * *